C. V. PUTNAM AND R. F. TRIMMER.
BAKING PAN.
APPLICATION FILED JULY 23, 1921.
1,419,756.
Patented June 13, 1922.
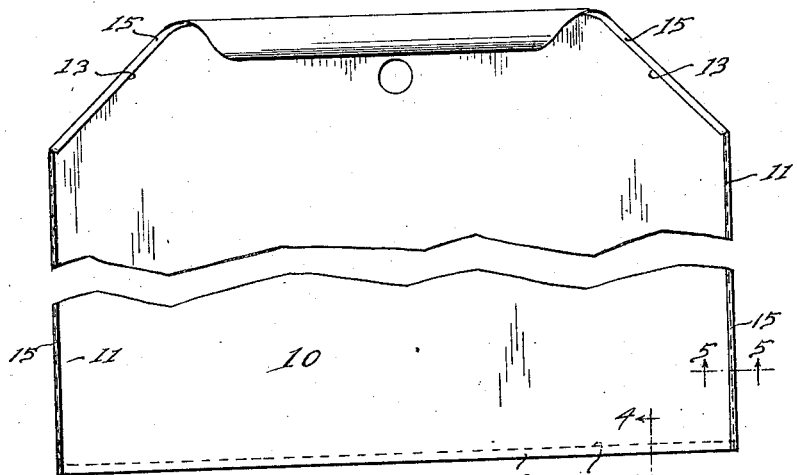
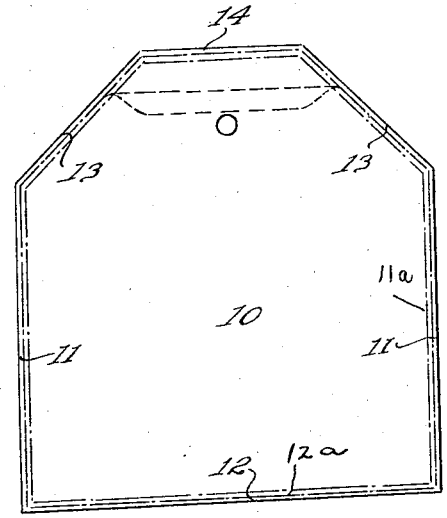
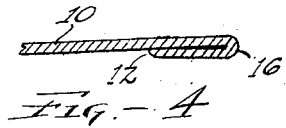
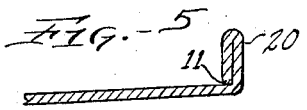

UNITED STATES PATENT OFFICE.

CHARLES V. PUTNAM AND RAY F. TRIMMER, OF EAST CLEVELAND, OHIO.

BAKING PAN.

1,419,756. Specification of Letters Patent. Patented June 13, 1922.

Application filed July 23, 1921. Serial No. 486,993.

*To all whom it may concern:*

Be it known that we, CHARLES V. PUTNAM, and RAY F. TRIMMER, citizens of the United States, residing at East Cleveland, county of Cuyahoga, and State of Ohio, have invented a certain new and useful Improvement in a Baking Pan, of which the following is a full, clear, and exact description, reference being had to the accompanying drawings.

This invention relates to cooking utensils and is primarily concerned with the provision of a baking pan which may be quickly and readily formed from a light sheet metal blank.

The principal features of our invention include the provision of a baking pan, wherein the entire surface is adapted to be quickly and readily cleaned, thereby providing a sanitary utensil, together with the provision of a pan which may be utilized on practically the entire surface for baking purposes, and which may be conveniently handled for removing the baked articles therefrom.

Our invention as shown in the drawing will be fully set forth in the following description pertaining thereto. The characteristics of our invention are set forth in the appended claims.

In the drawing, Fig. 1 is a side elevation of a baking pan embodying features of our invention; Fig. 2 is a plan of such a baking pan; Fig. 3 is a blank from which our baking pan may be formed; Fig. 4 is an enlarged section showing the construction of the edges. Fig. 5 is a similar section along the line 5—5 of Fig. 2.

Our invention contemplates the provision of a pan which may be stamped as a blank from sheet metal. Accordingly in Fig. 3, we have shown a blank 10 as having upturned sides an underturned end 12 and at the other end thereof diagonal sides 13 and a transverse side 14.

We prefer to turn the end edge over as shown in Fig. 4, in such manner that the upturned portion 15 is in close fitting engagement with the top of the body portion 10. That is, the inner edge of the flange is sloped smoothly to the upper surface of the body of the pan. The line along which the edge is underturned is shown by dot and dash line 12ª in Fig. 3 as extending entirely across the one end edge of the blank. The sides of the pan may be formed by a double bend along the blank edges. By folding the side edges 11 inwardly and then pressing them tightly against the top surface of the blank, there is little opportunity for accumulation of baking dough within the fold when the fold is again bent upwardly to obtain the upwardly extending sides 20 as illustrated in Fig. 5. Since the bottom surface is entirely smooth and the side folds are compact, the utensil is consequently not liable to accumulate any grease or sediment by contact of the metallic parts of the stove. These rounded, overturned and upturned edges protect the user and serve to stiffen the entire pan, holding it in a true plane, while permitting some degree of flexibility.

To provide a handle, we prefer to turn the side 14 upwardly and simultaneously roll it inwardly to such an extent that a convenient grip may be secured thereon. The degree of turning is preferably such that the edge of the side 14 terminates short of the top surface on the body portion 10, thus leaving a sufficient space for the insertion of a cloth beneath the roll for enabling one to keep the pan free from dirt, and therefore in a sanitary condition at all times.

The provision of a baking pan having a substantially flat surface enables one to use practically the entire area for baking purposes, and at the same time facilitates the ready removal of the baked articles from the pan. From a view point of manufacture, it is, of course, obvious that the simplicity of the article is a material advantage. Since the body portion of the metal is not depressed, it is therefore possible to employ a heavier gauge metal than is usually employed for manufacturing baking pans. By employing heavier gauged metal the life of the utensil is materially increased, and the article after once being formed is not susceptible to being permanently bent or distorted by ordinary wear and tear.

Having thus described our invention, we claim:

1. A baking pan having a body portion lying in a single plane and having the marginal edges thereof turned upwardly and inwardly, and having one end of the body portion rolled upwardly and inwardly to form a handle.

2. A baking pan comprising a flat body portion having marginal edges thereof turned inwardly and upwardly and pressed tightly against the upper surface of the body portion, there being one end of the body slightly tapered inwardly and rolled upwardly to form a handle, the foremost edge of the rolled portion terminating short of the top surface of the body.

3. A baking pan comprising a six-sided member having at one end three edges disposed at right angles to each other, and at the other end three edges disposed at an obtuse angle to each other, that portion of the surface adjacent the obtuse angled edges being rolled upwardly and inwardly to form a handle, and the foremost edge of the rolled portion terminating short of the top surface.

4. A baking pan comprising a six-sided member, three sides thereof being joined at right angles to each other, and three sides joined at obtuse angles, said member having a marginal edge turned downwardly and then upwardly to abut the under surface, the turned in portion being beveled adjacent the point of contact with said surface, and having the portion adjacent the obtuse angled sides rolled upwardly and inwardly to form a handle, the foremost edge of the rolled portion terminating short of the upper surface, whereby a cloth may be readily inserted thereunder for cleansing purposes.

5. A baking pan comprised substantially of a metallic blank having folded marginal edges, one of the edges being folded inwardly in contact with the under surface of the blank, while two of the edges are folded inwardly in pressed contact with the upper surface of the blank, said last named fold being bent to project upwardly from the top surface of the blank to form side portions, said blank having another end tapering inwardly and rolled inwardly to form a handle, the foremost edge of the rolled portion terminating short of the top surface of the body.

In testimony whereof, we hereunto affix our signatures.

CHARLES V. PUTNAM.
RAY F. TRIMMER.